United States Patent
Tonegawa et al.

[11] Patent Number: 5,878,005
[45] Date of Patent: *Mar. 2, 1999

[54] INFORMATION RECORDING/ REPRODUCING APPARATUS FOR PERIODICALLY EXECUTING SERVO PROCESSING

[75] Inventors: Nobuyuki Tonegawa, Kawasaki; Tsukasa Ogino, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 523,446

[22] Filed: Sep. 5, 1995

[30] Foreign Application Priority Data

Sep. 5, 1994 [JP] Japan .................................. 6-211334
Oct. 19, 1994 [JP] Japan .................................. 6-253286

[51] Int. Cl.$^6$ ................................................ G11B 7/00
[52] U.S. Cl. ................................. 369/44.27; 369/44.29; 369/44.34
[58] Field of Search .......................... 369/44.35, 44.36, 369/44.28, 44.29, 32, 44.34, 54

[56] References Cited

U.S. PATENT DOCUMENTS

| | | | |
|---|---|---|---|
| 5,077,719 | 12/1991 | Yanagi et al. | 369/44.28 |
| 5,079,755 | 1/1992 | Hangai et al. | 369/44.25 |
| 5,195,067 | 3/1993 | Yanagi | 369/32 |
| 5,428,590 | 6/1995 | Ogino | 369/44.28 |
| 5,502,695 | 3/1996 | Miura et al. | 369/32 |
| 5,570,330 | 10/1996 | Okawa | 369/44.34 |

Primary Examiner—Thang V. Tran
Attorney, Agent, or Firm—Fitzpatrick, Cella, Harper & Scinto

[57] ABSTRACT

An information recording/reproducing apparatus for recording information on and/or reproducing information from a recording medium using a head. The apparatus includes a single processor and a memory device. The single processor executes data input/output processing and servo processing of a light beam from the head, while alternately switching at a predetermined period. The servo processing is divided into a plurality of blocks which are cyclically executed in turn for each predetermined period and processing required to be executed in each period is set in each block and processing not required to be executed in each period is set in only a specific block. The memory device stores contents of the processing for the respective blocks.

4 Claims, 17 Drawing Sheets

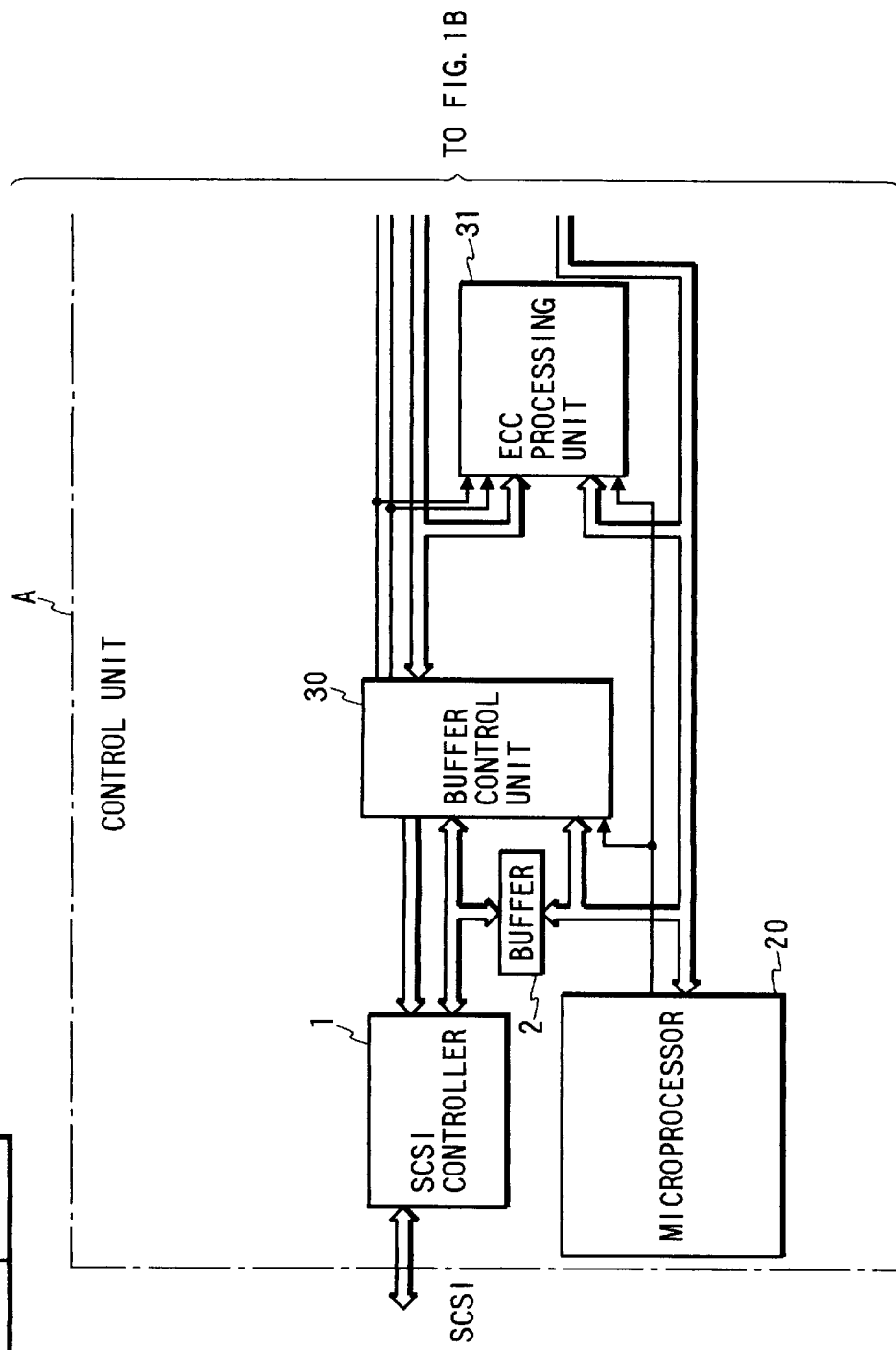

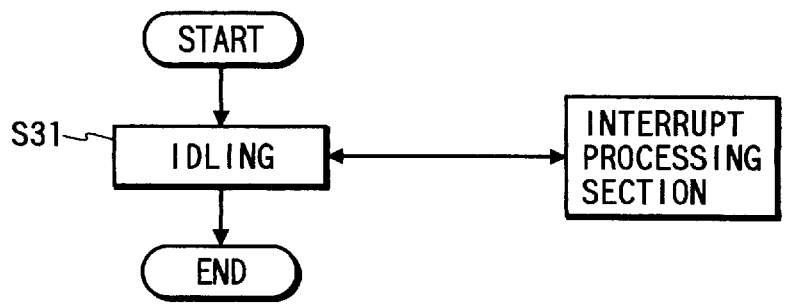
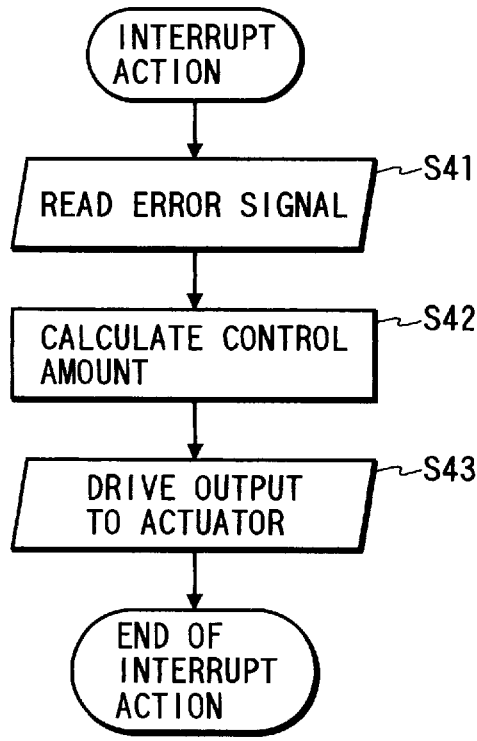

FIG. 13A

| | UPON READING | | |
|---|---|---|---|
| 0 | AT_Filter | AF_Filter | AT_Err |
| 1 | AT_Filter | AF_Filter | |
| 2 | AT_Filter | AF_Filter | TR_Filter |
| 3 | AT_Filter | AF_Filter | |
| 4 | AT_Filter | AF_Filter | AT_Err |
| 5 | AT_Filter | AF_Filter | 32 PROCESSING |
| 6 | AT_Filter | AF_Filter | |
| 7 | AT_Filter | AF_Filter | SPN_Count |

| | UPON ERASING/WRITING | | | | |
|---|---|---|---|---|---|
| 0 | AT_Filter | AF_Filter | AT_Err | AF_Err | |
| 1 | AT_Filter | AF_Filter | AT_Err | AF_Err | |
| 2 | AT_Filter | AF_Filter | AT_Err | AF_Err | TR_Filter |
| 3 | AT_Filter | AF_Filter | AT_Err | AF_Err | |
| 4 | AT_Filter | AF_Filter | AT_Err | AF_Err | |
| 5 | AT_Filter | AF_Filter | AT_Err | AF_Err | 32 PROCESSING |
| 6 | AT_Filter | AF_Filter | AT_Err | AF_Err | |
| 7 | AT_Filter | AF_Filter | AT_Err | AF_Err | SPN_Count |

| | UPON WAITING | | |
|---|---|---|---|
| 0 | AF_Filter | WAIT | AT_Err |
| 1 | AF_Filter | WAIT | |
| 2 | AF_Filter | WAIT | TR_Filter |
| 3 | AF_Filter | WAIT | |
| 4 | AF_Filter | WAIT | AT_Err |
| 5 | AF_Filter | WAIT | 32 PROCESSING |
| 6 | AF_Filter | WAIT | |
| 7 | AF_Filter | WAIT | SPN_Count |

| | UPON SEEKING | | |
|---|---|---|---|
| 0 | AF_Filter | Velocity | |
| 1 | AF_Filter | Track_Count | |
| 2 | AF_Filter | LPSV_Filter | |
| 3 | AF_Filter | Velocity_Check | |
| 4 | AF_Filter | Velocity | |
| 5 | AF_Filter | Track_Count | |
| 6 | AF_Filter | LPSV_Filter | |
| 7 | AF_Filter | Velocity_Check | SPN_Count |

INFORMATION RECORDING/REPRODUCING APPARATUS FOR PERIODICALLY EXECUTING SERVO PROCESSING

BACKGROUND OF THE INVENTION

1. Field of the Invention

The present invention relates to an optical information recording/reproducing apparatus for optically recording information on and/or reproducing information from an information recording medium.

2. Related Background Art

FIGS. 1A and 1B are block diagrams showing the arrangement of a conventional magneto-optical disc apparatus. The magneto-optical disc apparatus is disclosed in "Magneto-optical Disc Apparatus", 148-th Oki Denki Gihou, Vol. 57, No. 4. The magneto-optical disc apparatus shown in FIG. 1 is mainly constituted by a control unit A, a drive unit B, and a power source unit 32.

The control unit A comprises an SCSI controller 1, a buffer memory 2, a drive control unit 21 for controlling data transfer to the drive unit B, and the action of the drive unit B, an ECC processing unit 31 for performing error correction of reproduced data, a buffer control unit 30 for controlling the data buffer, a microprocessor 20 for controlling these units, and the like. A medium loading/ejecting mechanism 10 is arranged in the drive unit B. With this mechanism, a magneto-optical disc 16 can be loaded into and ejected from the drive unit main body. The magneto-optical disc 16 is rotated at a predetermined velocity by the drive action of a disc rotation mechanism 9. An external magnetic field (magnetic head) is arranged above the upper surface of the magneto-optical disc 16, and an optical head including an optical system 14 and an actuator 12 is arranged below the lower surface of the magneto-optical disc 16. The optical system 14 includes a semiconductor laser serving as a light source, an objective lens for focusing a laser beam from the semiconductor laser to a very small beam spot, a photosensor for detecting light reflected by the magneto-optical disc 16, and the like. A servo control unit 22 performs tracking control and focusing control of the beam spot of the optical system 14 on the basis of the detection signal from the photosensor.

When information is recorded on the magneto-optical disc 16, recording data is modulated by a signal processing unit 15, and the intensity of the beam spot of the optical system 14 is modulated on the basis of the modulated signal. The beam spot is irradiated onto the magneto-optical disc 16, and a predetermined external magnetic field is applied to the disc 16, thereby recording an information train on an information track. On the other hand, when recorded information is reproduced, the optical system 14 irradiates a laser beam of a reproduction power, and the signal processing unit 15 performs predetermined signal processing on the basis of the detection signal from the photosensor, thereby reproducing recorded information. Reproduced data is transferred to a host computer via the control unit A. The respective units described above of the drive unit B are controlled by a microprocessor 23.

However, the conventional magneto-optical disc apparatus requires microprocessors respectively in the control unit and the drive unit. Although not shown, these microprocessors inevitably require memories for storing programs, variables, and the like, and these memories must be arranged in both the drive unit and the control unit. Furthermore, the drive control unit 21 is required to smoothly control the control unit and the drive unit. As described above, the conventional magneto-optical disc apparatus requires a plurality of microprocessors and memories, and the drive control unit. Therefore, it is difficult to attain cost and size reductions of the apparatus.

SUMMARY OF THE INVENTION

The present invention has been made in consideration of the conventional problems, and has as its object to provide an optical information recording/reproducing apparatus which can sufficiently attain the conventional functions by a single microprocessor, and can realize cost and size reductions.

In order to achieve the above object, there is provided an information recording/reproducing apparatus for recording information on and/or reproducing information from a recording medium using a head, comprising:

digital servo control means for periodically executing servo control of the head; and storage means for storing a content of arithmetic processing periodically executed by the servo control means, wherein the storage means stores contents of a plurality of arithmetic processing actions corresponding to a plurality of action states of the apparatus.

BRIEF DESCRIPTION OF THE DRAWINGS

FIG. 9 is a flow chart showing the action of an idle task;

FIG. 10 is a flow chart showing the track trace control action of the interrupt processing section;

FIGS. 13A and 13B show arithmetic tables according to the second embodiment of the present invention, in which FIG. 13A shows arithmetic tables in the respective modes, and FIG. 13B shows an arithmetic table for 32 processing;

FIG. 17 is a flow chart showing Change Mode processing according to the second embodiment of the present invention.

DETAILED DESCRIPTION OF THE PREFERRED EMBODIMENTS

[First Embodiment]

Figure 1B:
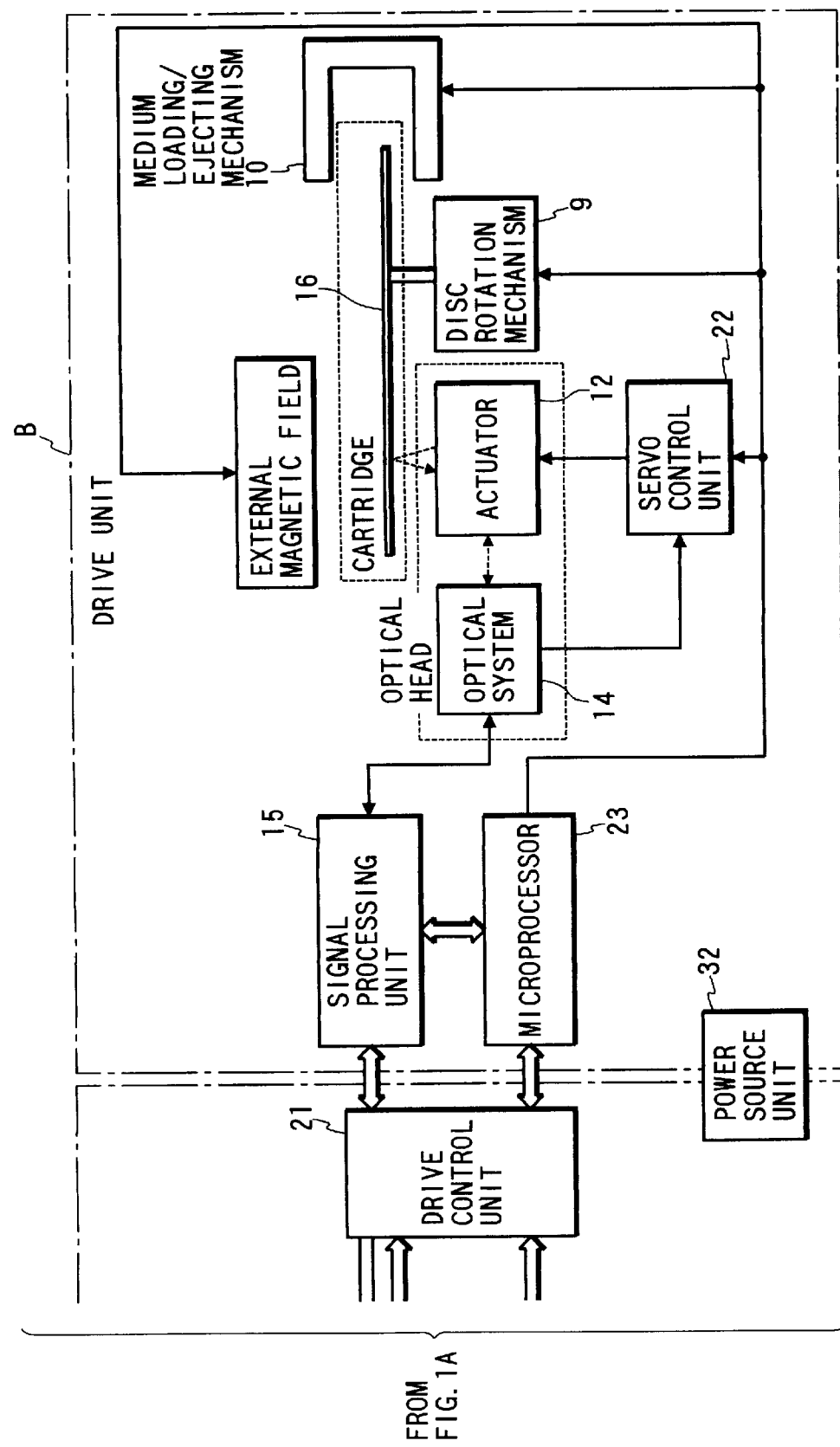
FIG. 1 is comprised of FIGS. 1A and 1B illustrating block diagrams showing a conventional magneto-optical disc apparatus.
Figure 2:
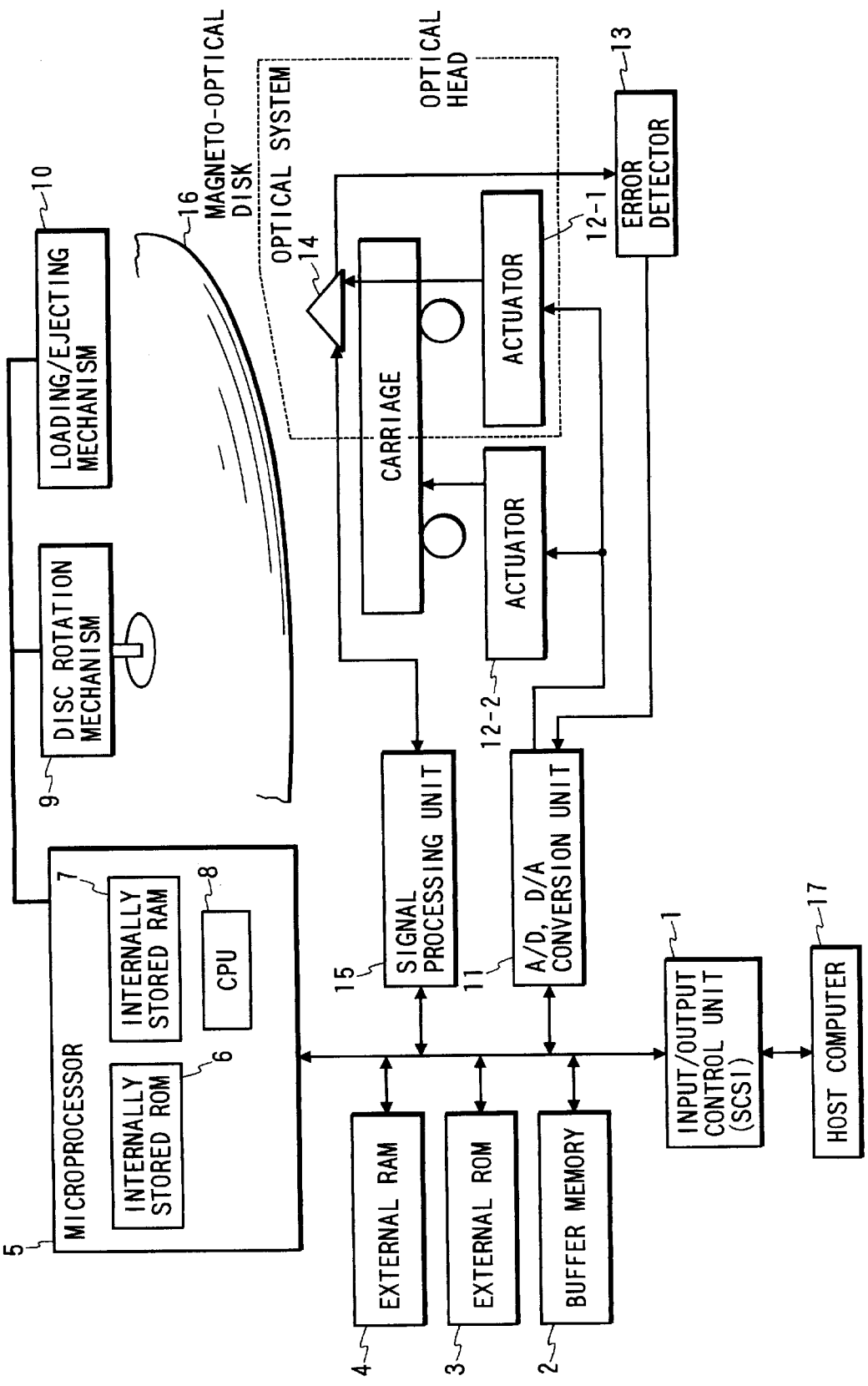
FIG. 2 is a block diagram showing an optical information recording/reproducing apparatus according to the first embodiment of the present invention.

The first embodiment of the present invention will be described in detail below with reference to the accompanying drawings. FIG. 2 is a block diagram showing an optical information recording/reproducing apparatus according to the first embodiment of the present invention. Note that the same reference numerals in FIG. 2 denote the same parts as in FIGS. 1A and 1B, i.e., an input/output control unit 1, a buffer memory 2, a disc rotation mechanism 9, a loading/ejecting mechanism 10, an actuator 12, an optical system 14, a signal processing unit 15, and a disc 16 are the same as those in FIGS. 1A and 1B.

In addition to these components, the apparatus of this embodiment comprises a microprocessor 5 constituted by a single CPU 8 and internal memories (an internal ROM 6 and an internal RAM 7) formed on the same chip as the CPU 8, an external ROM 3 and an external RAM 4 for storing programs and variables, an error detector 13 for detecting position error signals of the optical head from the optical system 14, and an A/D, D/A conversion unit 11 for converting error signals from the error detector 13 into digital signals, and converting a control signal from the microprocessor 5 into an analog signal. Note that the buffer control unit 30, the ECC processing unit 31, and the power source unit 32 shown in FIGS. 1A and 1B are not shown in FIG. 2. The servo control unit 22 in FIG. 1B corresponds to the microprocessor 5, the A/D, D/A conversion unit 11, and the error detector 13 in this embodiment to realize the servo control by digital servo control.

More specifically, an actuator 12-1 comprises a tracking actuator for moving a focusing objective lens (not shown) arranged in the optical system 14 in the radial direction of the magneto-optical disc 16, and a focusing actuator for moving the objective lens in a direction perpendicular to the surface of the magneto-optical disc 16. The optical system 14 and these two actuators are assembled in an optical head, which is movable in the radial direction of the magneto-optical disc 16 so as to access a required track. An actuator 12-2 comprises a linear motor for moving the optical head in the radial direction of the magneto-optical disc 16. The error detector 13 detects tracking and focusing error signals on the basis of the output from a sensor in the optical system 14. The error signals are converted into digital signals by the A/D, D/A conversion unit 11, and the digital signals are output to the CPU 8.

A host computer 17 is an apparatus for issuing commands such as a recording/reproducing command to the optical information recording/reproducing apparatus of this embodiment, and the optical information recording/reproducing apparatus of this embodiment is connected as an external storage apparatus to the host computer 17. The input/output control unit 1 receives a command from the host computer 17, and supplies the received command to the microprocessor 5.

The microprocessor 5 serves as a main control unit of the optical information recording/reproducing apparatus of this embodiment. The microprocessor 5 performs the input/output action (to be also referred to as a recording/reproducing action) of recording/reproducing data for temporarily storing recording data transferred from the host computer 17 in the buffer memory 2 in the apparatus, and supplying the recording data from the buffer memory 2 to the optical head, and/or outputting reproduced data read out from the magneto-optical disc 16 to the host computer 17, the position control action of a laser beam (including the tracking/focusing action), and the velocity control in seek control.

Figure 3:
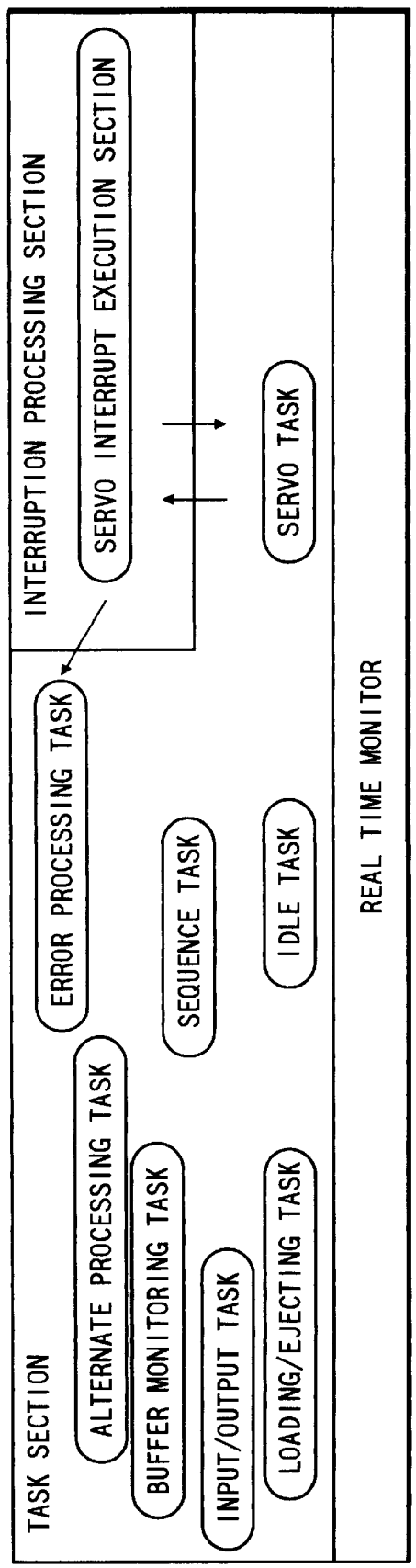
FIG. 3 is a schematic view showing the configuration of a program of the embodiment shown in FIG. 2.

The action of this embodiment based on the above-mentioned arrangement will be described below. FIG. 3 is a schematic view showing the configuration of the program in the microprocessor 5. In this case, the program has a task management type configuration based on a real time monitor (having the same meaning as a real time OS). For example, when the host computer 17 inputs a recording command to the input/output control unit 1, a sequence task which performs task management in a task section sets a high start priority of an input/output task in FIG. 3 (designated by an event), and starts the input/output task at the same time. In the input/output task, the input/output control unit 1 receives and interprets a command. At this time, other tasks are set in the waiting or halt state. Servo control such as focusing/tracking control or the like is time-divisionally processed in parallel as interrupt processing. Upon completion of the input/output processing of the command, the sequence task lowers the priority of the input/output task, and starts another task with high priority. In this embodiment, control of data to be recorded/reproduced, loading/ejecting control, error processing of the apparatus, and the like are executed in the task management, and control which requires real-time processing such as tracking control, focusing control, seek control of the optical head, and the like is executed apparently parallel to task execution in a time-divisional processing format (interrupt processing).

Figure 4:
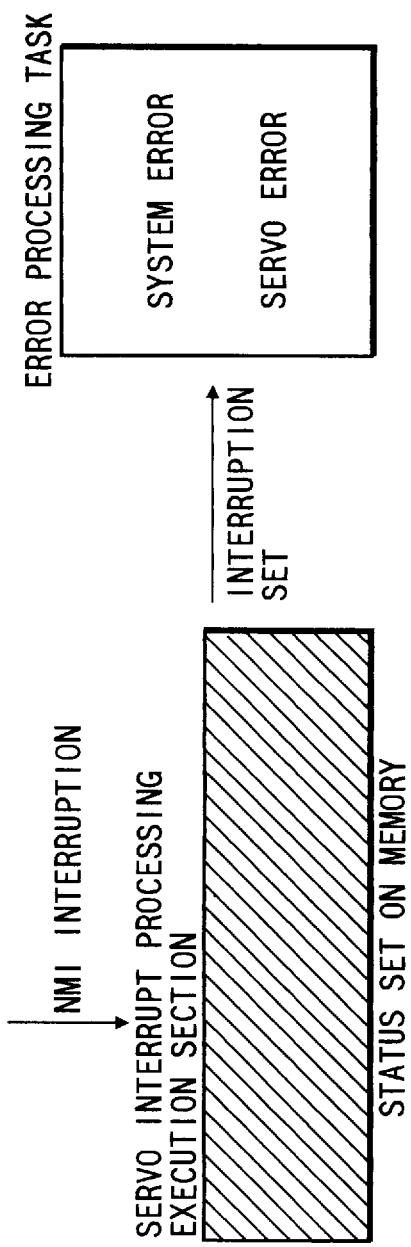
FIG. 4 is a schematic view showing the arrangement of an interrupt processing section.

FIG. 4 schematically shows the arrangement of an interrupt processing section which performs the above-mentioned interrupt processing. In this embodiment, when a servo interrupt processing section is called at a predetermined period by an interrupt based on an NMI (nonmaskable interrupt), and ends a predetermined action, the end state is stored in an internal memory, and a status interrupt is set, thus ending the processing. As for errors (such as a servo error, an abnormal temperature rise in the apparatus, and the like) during execution of the servo interrupt processing, error information is similarly set in the internal memory, and a status interrupt is set, thus ending the processing. The task section which has a higher order than the interrupt processing execution section starts an associated task in response to the status interrupt command. For example, when the seek control executed in the interrupt processing execution section normally ends, the task section starts a servo task shown in FIG. 3 to access and analyze end status, and thereafter, ends the task. When an error has occurred, an error processing task is started to access the status, and recovery processing is executed in correspondence with the status.

Figure 5:
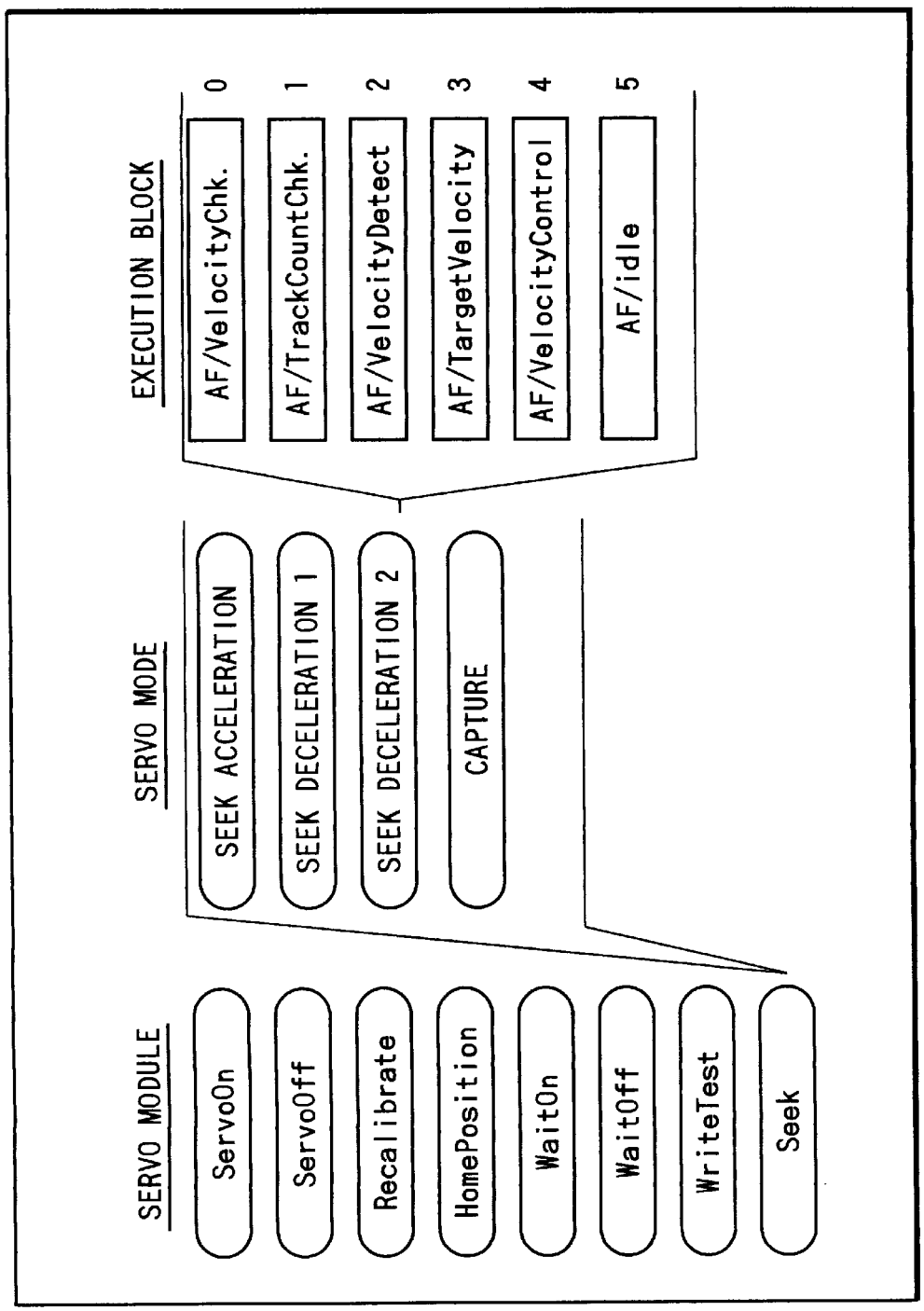
FIG. 5 is a schematic view showing the arrangement of functions executed by the interrupt processing section.

FIG. 5 schematically shows the configuration of a servo control processing program (stored in the internal ROM 6) executed by the interrupt processing section. The servo control is roughly divided into eight modules (operation states of the apparatus), and each servo module corresponds to a unit executed by the host servo task. For example, a "Servo On" module starts all the servo control actions such as a focusing action, tracking action, and the like by the servo task, and manages a series of actions until a recording/reproducing action is ready to perform. A "Servo Off" module is a module for performing an action for stopping all the servo actions by the servo task, and stops the focusing and tracking actions and the control action of the linear motor. A "Recalibrate" module informs all the abnormal states to the host when some abnormality (e.g., a focusing error that has suddenly occurred due to scratches or dust on the medium) is detected during the servo control action, and manages a series of processing actions for continuing the actions of the above-mentioned "Servo On" module.

A "Wait On" module is a module for managing an action for positioning a laser beam on a single track. This module includes a trace mode and a single jump mode. In the single jump mode, the count value of clocks from the disc rotation mechanism 9 for rotating the magneto-optical disc 16 is monitored. When the count value becomes equal to that corresponding to one revolution of the magneto-optical disc 16, the tracking servo is disabled and the laser beam position is jumped to the original neighboring track. In this manner, the laser beam is positioned on a single track. A "Wait Off" module is a module for disabling the wait action for positioning the laser beam on a single track. When the wait action is disabled, the laser beam is set in the trace mode.

A "Seek" module manages a series of actions until the optical head is moved to the target position. In the case of the digital servo using the CPU, a communication with the host, processing of recorded or reproduced data, control of recording/reproducing processing, and the like are apparently executed parallel to the servo processing which is sequentially executed as interrupt processing. For this reason, each interrupt processing must complete its processing within a predetermined period of time. The operation of this state will be described in detail below taking the seek action as an example.

Figure 11A:
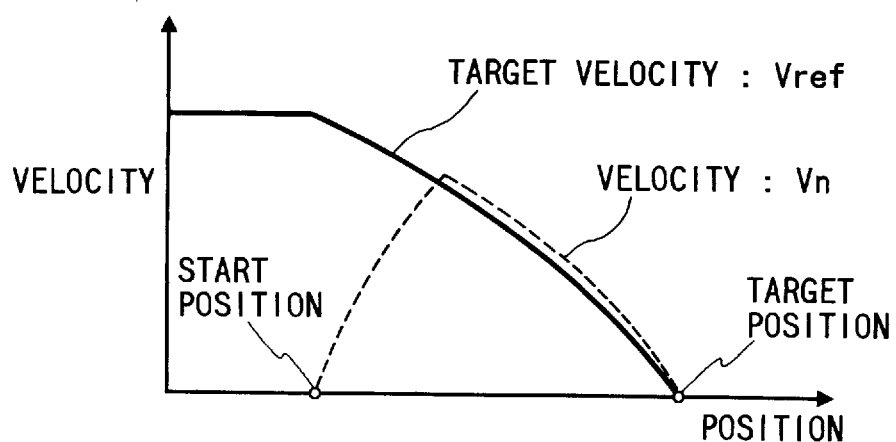
FIGS. 11A and 11B are graphs for explaining the velocity control method in the seek action of an optical head.
Figure 11B:
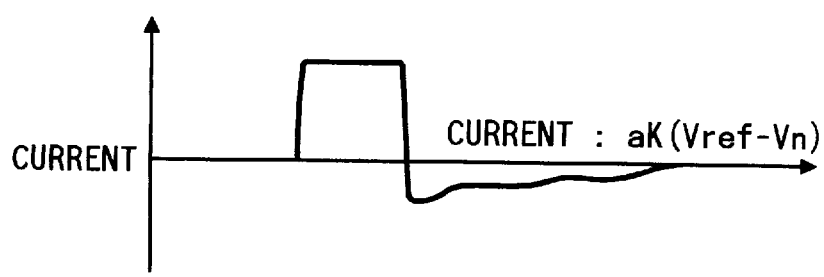

In the seek action, movement control is realized by accelerating/decelerating the linear motor, as shown in FIGS. 11A and 11B. The detailed servo control will be described later. Assume that interrupt processing upon seek acceleration is defined as a seek acceleration mode, interrupt processing upon seek deceleration is defined as seek deceleration 1 and 2 modes, and interrupt processing upon execution of tracking control after the optical head has reached the target position is defined as a capture mode. In this manner, the seek control is divided depending on the control states. When the module is divided into a plurality of modes, and the seek mode is sequentially switched every time the seek state changes, an action for checking the current seek state and selecting a control action suitable for the current state upon each execution of the interrupt control section can be omitted. More specifically, since the execution mode of the interrupt control section is sequentially changed in correspondence with a change in seek state, the time required for mode discrimination upon each interrupt can be eliminated.

Figure 6:
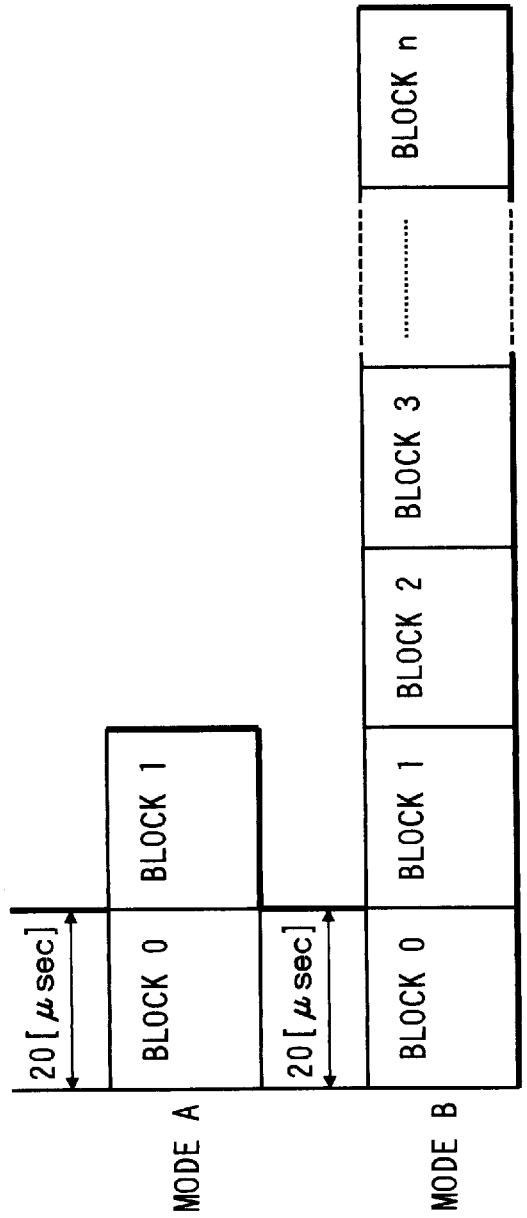
FIG. 6 is a view for explaining the execution sequence of the interrupt processing section.

Furthermore, in this embodiment, as shown in FIG. 5, the servo mode is functionally divided into a plurality of blocks. For example, in the seek deceleration 2 mode, six execution blocks are cyclically executed in turn. This will be described in detail below with reference to FIG. 6. FIG. 6 shows two modes, i.e., modes A and B. Mode A is constituted by two blocks, and blocks 0 and 1 are alternately executed every time a servo control interrupt is generated. In this case, the servo interrupt interval is set to be 20 $\mu$sec. Mode B is constituted by n blocks, and blocks 0, 1, 2, 3, . . . , n, 0, 1, . . . are cyclically executed in turn every time a servo interrupt is generated. More specifically, each mode is constituted by a plurality of blocks to be cyclically executed. In FIG. 5, block 0 executes focusing control (filtering arithmetic processing for phase compensation and driving control of the focusing actuator), and velocity detection for seek control, and block 1 executes focusing control, and track count processing for the seek control. In this manner, in the respective blocks, the focusing control is performed in the former half portion, and processing actions required for the seek control are divisionally assigned in the latter half portion. With this operation, heavy load processing such as seek control can be efficiently executed in a sequential execution pattern based on interrupt processing.

Figure 7:
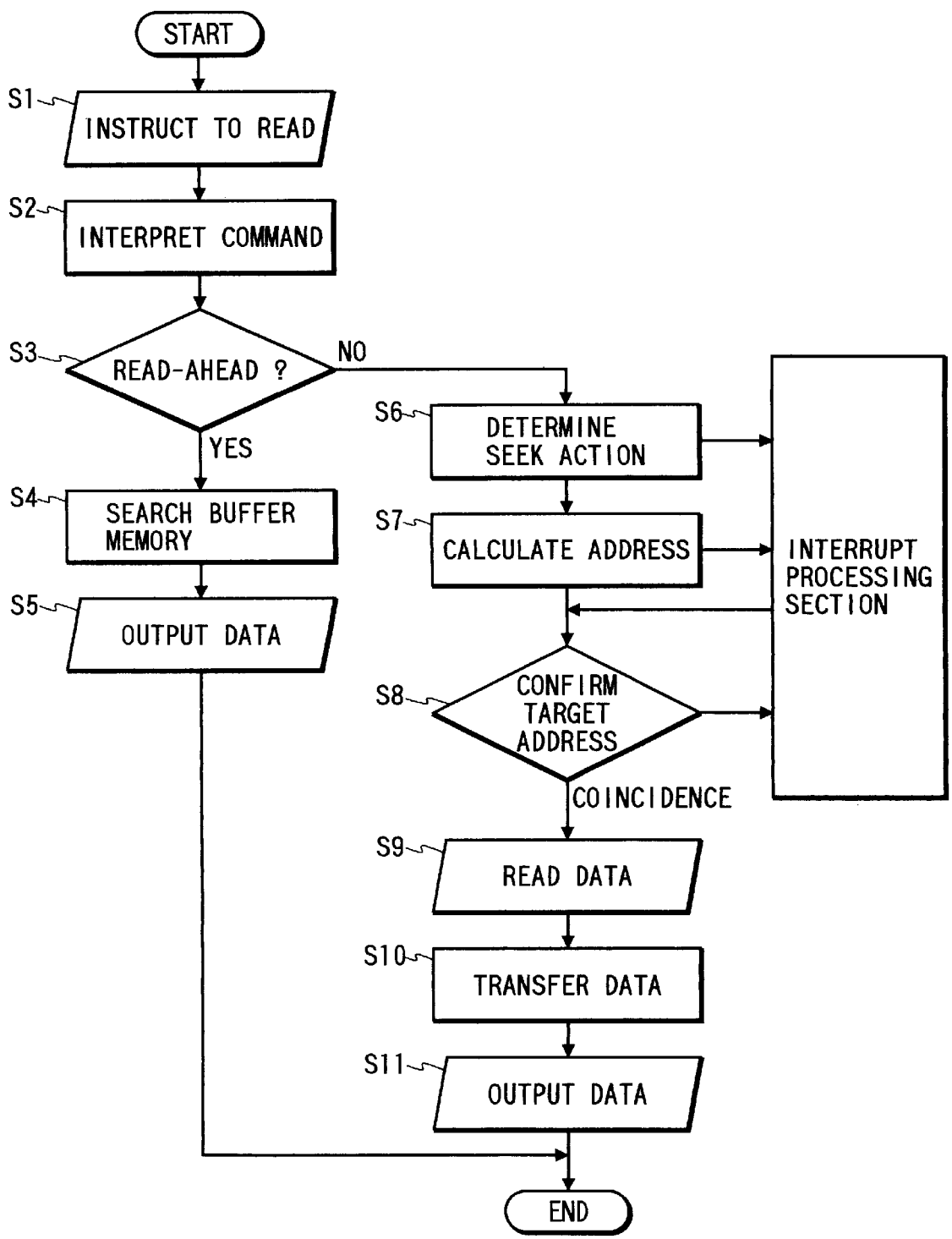
FIG. 7 is a flow chart showing the control action upon data reading.

The detailed operation of this embodiment will be described below. FIG. 7 is a flow chart showing the control action upon data reading. The operation will be described below with reference to FIG. 7 together with the block diagrams shown in FIGS. 2 and 3. A data read command from the host computer 17 is read by the input/output control unit 1 (S1). In this case, as described above, the input/output task is started and executed. More specifically, the CPU 8 in the microprocessor 5 interprets the command (S2). Then, the input/output task is stopped, and a buffer monitoring task for performing a reproduction operation is started by the sequence task. When the buffer monitoring task is started, it is checked if data is read ahead (S3). This is to check if requested data is already present in the buffer memory 2.

If the requested data is present, the buffer memory 2 is searched (S4), and predetermined data is output to the host computer via the input/output control unit 1. At this time, the sequence task sequentially switches the task from the buffer monitoring task to the input/output task. If it is determined in step S3 that data is not read ahead, the buffer monitoring task determines a seek action, and simultaneously issues a command indicating this to the interrupt processing section. In response to this command, the interrupt processing section switches the action mode to the seek action mode (S6). During the processing executed so far, the interrupt processing section executes a servo control action, i.e., the action shown in the flow chart in FIG. 10 time-divisionally.

The state of the task processing execution before execution of the servo control action is saved in the internal RAM 7, as described above. After the state is saved, the servo control action is executed, and upon completion of the servo control action, the task processing is executed from the state before the interrupt. In this embodiment, the time-divisional processing is executed at 20-$\mu$sec intervals. Note that the detailed operation of the interrupt processing section at that time will be described later. Although the action mode in the interrupt processing section has already been switched to the seek action mode, the buffer monitoring task subsequently performs an address calculation in the task section (S7).

The address calculation includes a primary address calculation for roughly calculating a moving direction and distance of the optical head from the target address by the CPU 8, and a secondary address calculation for accurately calculating a physical address based on the logical address and obtaining the moving distance. After the primary address calculation, the calculated information is supplied to a servo control action section. Upon reception of the calculation result, the interrupt processing section in the CPU 8 supplies an actuator drive signal to the A/D, D/A conversion unit 11. The A/D, D/A conversion unit 11 converts the input digital signal into an analog signal, and supplies the analog signal to the actuator 12-1 or 12-2. In this case, when the moving distance is small, the CPU 8 outputs a command to the actuator 12-1; when the moving distance is large, the CPU 8 outputs a command to the actuator 12-2. After the secondary address is calculated in address calculation step S7, a seek action based on an accurate velocity control action is executed.

In this case, the servo task is set in a waiting state. That is, the task section operates another task with a high start priority until a seek end status interrupt is generated by the interrupt processing section. For example, an alternate processing task, the buffer monitoring task, or the like operates.

Figure 8:
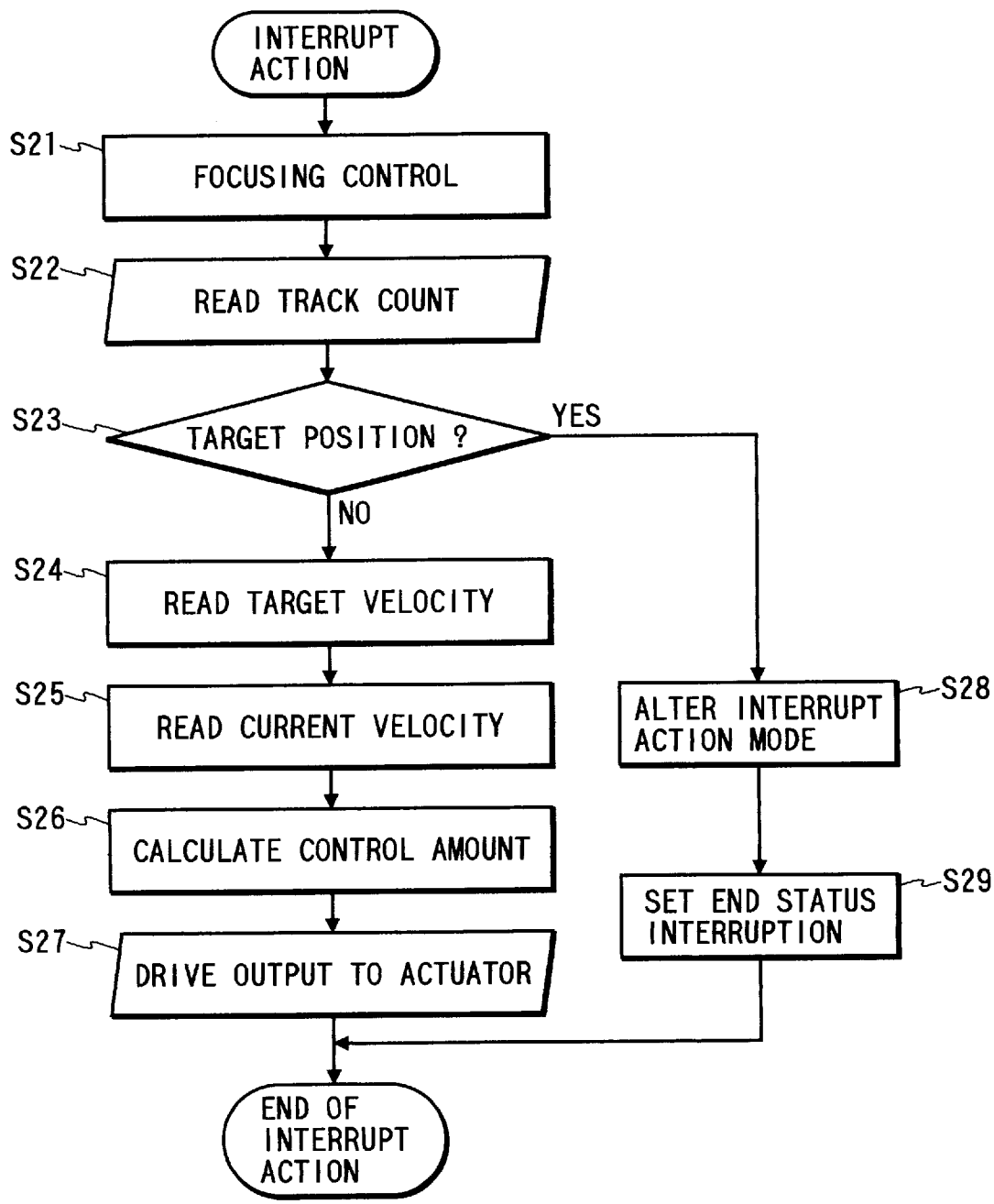
FIG. 8 is a flow chart showing the seek control action of the interrupt processing section.

The operation of the interrupt processing section which performs seek control will be described in detail below with reference to the flow chart in FIG. 8. In particular, the interrupt action associated with block 4 in FIG. 5 will be described. As described above, the time-divisional action of this embodiment is executed at 20-µsec intervals. When an interrupt is generated, a focusing control action is performed (S21). In this case, a focusing position error signal obtained from the error detector 13 is converted into a digital signal by the A/D, D/A conversion unit 11, and the digital signal is supplied to the microprocessor 5. Based on this digital signal, the CPU 8 calculates a focusing control signal using a predetermined arithmetic formula in the internal ROM 6 and predetermined parameters in the internal RAM 7, and outputs a drive signal to the actuator 12-1 via the A/D, D/A conversion unit 11. Then, the track count value is read (S22). The track count value is generated based on a tracking error signal obtained from the error detector 13. More specifically, the tracking error signal is converted into pulse signals by a binarizing circuit (not shown), and the pulse signals are counted by a counter (not shown). Note that the counter may be incorporated in the microprocessor 5. The track count value is compared with a target track count value (S23). If the two values coincide with each other, i.e., if the optical head has reached the target position, the interrupt action mode is altered (S28), and a seek end status is stored in the internal RAM 7 (S29). Thereafter, the processing ends.

In this embodiment, this alteration executes interrupt processing shown in FIG. 10 as a track trace mode thereafter. If it is determined in step S23 that the two values do not coincide with each other, a target velocity $V_{ref}$ is read from the current track count (S24). The action required in step S24 is to only read out the target velocity calculated by block 3 from a memory since the target velocity has already been calculated by block 3 shown in FIG. 5. Furthermore, since the current velocity to be calculated in step S25 has already been calculated by block 2 in FIG. 5, it need only be similarly read out from the memory. The velocity control method executed in this embodiment will be described later. A seek control amount is calculated based on an arithmetic formula stored in the internal ROM 6 using the calculated velocity values (S26). The seek control amount is output to the actuator 12-2 via the A/D, D/A conversion unit 11 (S27). In this case, when the moving distance is small, the CPU 8 outputs a command to the actuator 12-1; when the moving distance is large, the CPU 8 outputs a command to the actuator 12-2. Upon completion of the above-mentioned operation, the interrupt processing section ends its action, and the control shifts to the task section. The task section proceeds with the action executed before the interrupt processing is executed. Thereafter, when an interrupt is generated again, the interrupt processing in steps S21 to S27 is executed.

If the seek action ends in step S29, and a status interrupt is generated, the servo task set in the waiting state is started, and a target address confirmation action in step S8 in FIG. 7 is executed. In step S8, the signal processing unit 15 detects an address from a signal read from the magneto-optical disc 16 by the optical head, and the microprocessor 5 checks if the detected address is the target address. If the two addresses coincide with each other, the servo task ends, and the buffer monitoring task is started to read data (S8). If the two addresses do not coincide with each other, the seek action is executed again. The buffer monitoring task transfers data, which is detected by the signal processing unit 15 from a signal read from the magneto-optical disc 16 by the optical head, to the buffer memory 2, and sequentially outputs it to the input/output control unit 1 (S11). When predetermined data is transferred, the read operation ends, and an idle task is started.

FIG. 9 is a flow chart showing the operation of the idle task. The task section other than the interrupt processing section is set in an idling state (S31). At this time, the interrupt processing section is executing a track trace action. FIG. 10 is a flow chart showing the track trace action. When an interrupt command is input, a focusing position error signal and a tracking error signal obtained from the error detector 13 are converted into digital signals by the A/D, D/A conversion unit 11, and the digital signals are supplied to the microprocessor 5 (S41). Based on these signals, the CPU 8 calculates a focusing control signal and a tracking control signal using a predetermined arithmetic formula in the internal ROM 6 and predetermined parameters in the internal RAM 7 (S42), and outputs drive signals to the actuator 12-1 via the A/D, D/A conversion unit 11 (S43). In the focusing control and tracking control, this embodiment executes the tracking action first, and thereafter, executes the focusing control action.

The velocity control in the seek action of the optical head will be explained below. As the control method upon movement of the optical head to the target position on the magneto-optical disc 16, the velocity control method is normally used. As the velocity control method, a method of sequentially monitoring the velocity of the optical head and performing a seek action of the optical head in accordance with a predetermined operation plan is popular. FIGS. 11A and 11B are graphs showing the relationship between the target velocity and the actual velocity (FIG. 11A) and the current to be applied to the actuator 12b for driving the coarse carriage (FIG. 11B) in the general velocity control method. Referring to FIG. 11A, the target velocity $V_{ref}$ represents the velocity of the operation plan of the head, and is calculated in correspondence with the remaining distance to the target position. The target velocity $V_{ref}$ is calculated by the formula below:

$$V_{ref}=(2\cdot\alpha(S-\lambda/2\cdot N))^{1/2} \qquad (1)$$

where S is the target moving distance, $\lambda$ is the track pitch, $\alpha$ is the decelerating acceleration, and N is the zero-crossing count value. In order to control the head velocity to trace the target velocity, the current velocity of the head is sequentially detected. The detection method of the current velocity $V_n$ of the head is generally classified into those for high- and low-velocity ranges. In the high-velocity range, the track count method is used, and the current velocity is calculated based on the number of tracks, N, that the head crosses during a predetermined sampling interval $T_s$.

$$V_n=(\lambda/2\cdot N)/T_s \qquad (2)$$

On the other hand, in the low-speed range, the track interval count method is used. In this method, each zero-crossing point of a tracking error signal is detected, and a time $T_d$ from the detected zero-crossing point to the next zero-crossing point is measured. In this case, since the distance between the zero-crossing points is ½ the track pitch $\lambda$, the velocity at that time is given by formula (3) below:

$$V_n=(\lambda/2)/T_d \qquad (3)$$

Upon selection of the velocity detection method, when the current velocity is higher than a predetermined velocity value, the high-velocity range is used; otherwise, the low-velocity range is selected. When the velocity of the optical head is to be controlled, the command value of the actuator is calculated based on the current velocity and the target velocity at that time at a predetermined time period, and the velocity of the optical head is controlled by the calculated command value. In this manner, the relative velocity between the disc surface and the optical head is sequentially detected using the track count or the tracking error signal in the velocity detection method, and the head is sequentially controlled in accordance with the target velocity calculated from formula (1). In particular, the target velocity $V_{ref}$ shown in FIG. 11A is prepared in advance in a memory as a target velocity table in the internal ROM. The target velocity table stores velocity values calculated from formula (1) with respect to the remaining distance (i.e., the number of remaining tracks). With the above-mentioned velocity control method, a seek action of the optical head to the target position is performed in accordance with the predetermined operation plan.

[Second Embodiment]

Figure 12:
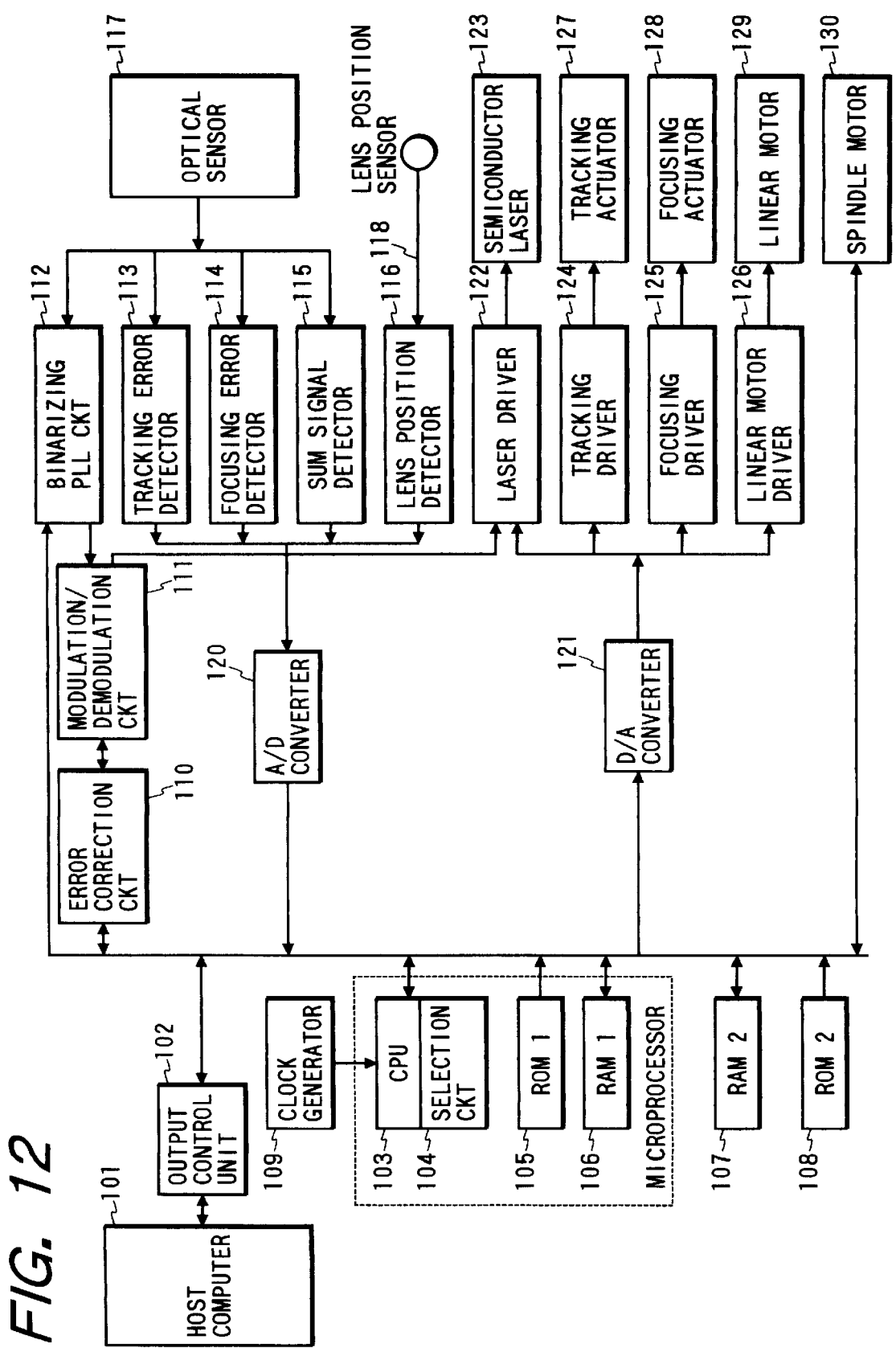
FIG. 12 is a block diagram showing an optical information recording/reproducing apparatus according to the second embodiment of the present invention.

The second embodiment of the present invention will be described in detail below with reference to the accompanying drawings. FIG. 12 shows an optical information recording/reproducing apparatus according to the second embodiment of the present invention.

Referring to FIG. 12, a host computer 101 and an optical disc drive apparatus are connected to each other via a SCSI interface.

An input/output control unit 102 belongs to an input/output unit of the optical disc drive apparatus, and comprises an SCSI interface circuit for receiving a read/write command from the host computer 101 and transmitting response data thereto. A CPU 103 is only one CPU in the apparatus, which controls the entire optical disc drive apparatus.

A ROM I 105 and a RAM I 106 store microcodes and calculation data used in servo control processing for positioning a beam spot on the target track.

A RAM II 107 and a ROM II 108 store microcodes and calculation data required for system control processing such as data transfer between the host computer 101 and an error correction circuit 110, and the like.

The CPU 103 generates a servo interrupt in response to the trailing edge timing of an output from a clock generator 109 of 50 kHz to switch a selection circuit 104, so that the CPU 103 executes the servo control processing for positioning the beam spot on the target address, or the like, in place of the system control processing. Upon completion of the servo control processing, the selection circuit 104 selects a system control program stored in the ROM II 108, and the CPU 103 subsequently executes a program before the interrupt. In this manner, the CPU 103 time-divisionally switches two states to execute the system control processing and the servo control processing.

Since the CPU 103, the selection circuit 104, the ROM I 105, and the RAM I 106 are formed on a single semiconductor chip, the transfer time can be shortened, and a higher-speed action can be realized than that when the RAM II 107 and the ROM II 108 are used.

The frequency of the clock generator is fixed at 50 kHz, and the remaining time obtained by subtracting the servo control processing time from this 20-$\mu$sec time (50 kHz) is used as the system control processing time. For this reason, shortening the servo control processing time leads to high-speed processing of the entire system.

Even when the system control processing state is selected by the selection circuit 104, servo information such as decentering information, and the servo control processing program stored in the ROM I 105 and the RAM I 106 can be subjected to high-speed read/write accesses, and a large volume of data can be referred to at high speed.

When a disc to be subjected to recording/reproducing is a ZCAV disc which has different recording densities in units of several zones in correspondence with the radial distance, the CPU 103 sets the synchronization frequency of zone data corresponding to the address to be reproduced in a binarizing PLL circuit 112 to convert reproduced data into digital data.

Therefore, the binarizing PLL circuit 112 detects data from a reproduced signal generated by a photosensor 117 for detecting light reflected by an optical disc while achieving synchronization, and converts the detected data into a digital signal.

The reproduced digital signal is converted into data in the host computer format by a modulation/demodulation circuit 111. When a data error has occurred, the data is corrected to normal data by the error correction circuit 110, and the data is transferred from the CPU 103 to the host computer 101.

The error correction circuit 110 and the modulation/demodulation circuit 111 convert 639-Byte data of the data field of one sector of a disc into 512-Byte data, and in this case, they have an error correction capacity up to 40 Bytes. When the error correction exceeds a predetermined value (e.g., 20 Bytes), the error correction circuit 110 informs the CPU 103 of this fact.

When data is to be recorded, the CPU 103 transmits recording data supplied from the host computer 101 to the error correction circuit 101, and converts the data into data in the disc recording data format using the modulation/demodulation circuit 111. Then, the CPU 103 stores the converted data. Meanwhile, the CPU 103 sets data of a laser write power voltage level, at which a semiconductor laser 123 emits light with write power, in a D/A converter 121.

The data converted into the disc format by the modulation/demodulation circuit 111 and the laser write power voltage are synthesized and amplified by a laser driver 122, and the amplified signal turns on the semiconductor laser 123, thus recording data on the disc.

Upon completion of recording, in order to confirm if the recorded sector is normally written, a data verification action is executed.

A tracking error detector 113, a focusing error detector 114, and a sum signal detector 115 respectively output a tracking error signal, a focusing error signal, and a sum signal on the basis of the output signal from the photosensor 117.

Furthermore, a lens position sensor 118 measures the decentering amount of a tracking actuator 127, and a lens position detector 116 outputs a lens positioning signal.

These signals are converted by an A/D converter 120 into digital signals. The CPU 103 reads these signals in response to the trailing edge timing of the clock generator 109, and sets these digital signals in the D/A converter 121.

The signals set in the D/A converter 121 are respectively amplified by a tracking driver 124, a focusing driver 125, and a linear motor driver 126 to drive the tracking actuator 127, a focusing actuator 128, and a linear motor 129, thereby positioning the laser beam spot on the target track.

Figure 13:
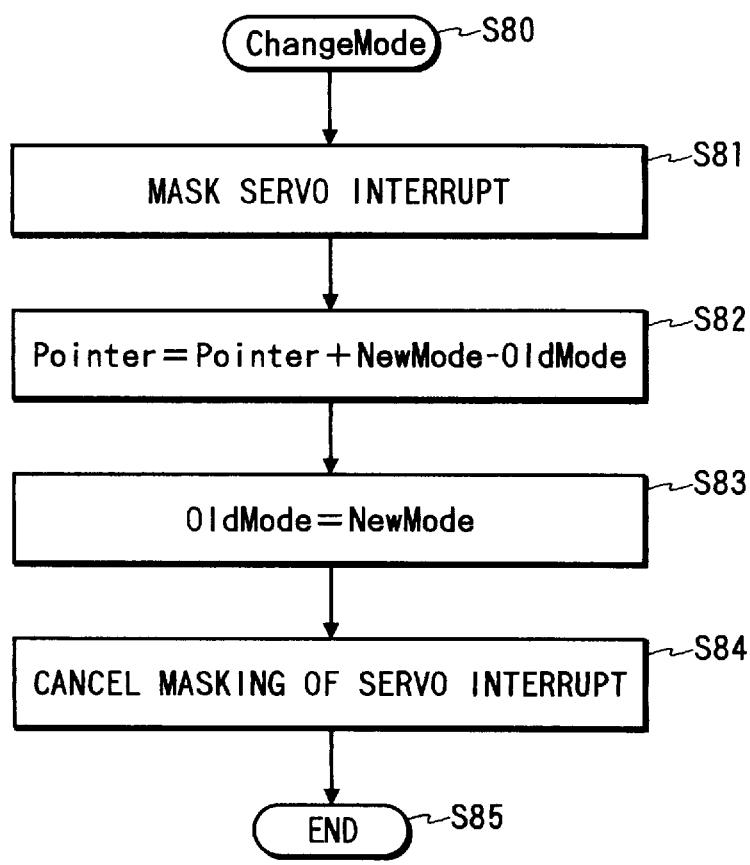

FIG. 13A shows arithmetic tables (stored in the ROM I 105) of the servo control processing program activated at 20-$\mu$sec intervals by the oscillation frequency of 50 kHz of the clock generator 109.

In these arithmetic tables, the servo control is classified into four modes (the action states of the apparatus; having the same meaning as modules in the first embodiment), i.e., a reading mode upon reading of disc information, an erasing/writing mode upon erasing/writing from/on the disc, a waiting mode, and a seeking mode upon movement to the target track. A table in each of the four modes is divided into sections 0 to 7 in the vertical direction, and one section is activated at 20-μsec intervals, so that processing actions in the horizontal direction are processed in turn.

In each mode, after table 0 is executed, table 1 is executed next, and thereafter, tables 2, 3, 4, 5, 6, and 0 are executed in turn. Execution of all tables 0 to 7 requires 160 μsec.

The modes and tables are prepared in correspondence with the expected number of action states of the apparatus. This embodiment exemplifies typical tables in the reading, erasing/writing, waiting, and seeking modes.

FIG. 13B shows the contents of an arithmetic processing table of 32 processing executed at the end of tables 5 in the reading, erasing/writing, and waiting modes. These processing actions are modules that require processing at 640-μsec intervals.

The 32 processing is divided into four internal modules. Since the 32 processing is called at 160-μsec intervals, each internal module of the 32 processing in each mode is activated at 640-μsec intervals.

The reason why modules activated at 640-μsec intervals are independently described is to avoid an increase in table size. More specifically, if modules of a 640-μsec period and high-speed processing modules of a 20-μsec period are described together, each table must include sections 0 to 31, and the table size increases to four times.

Figure 14:
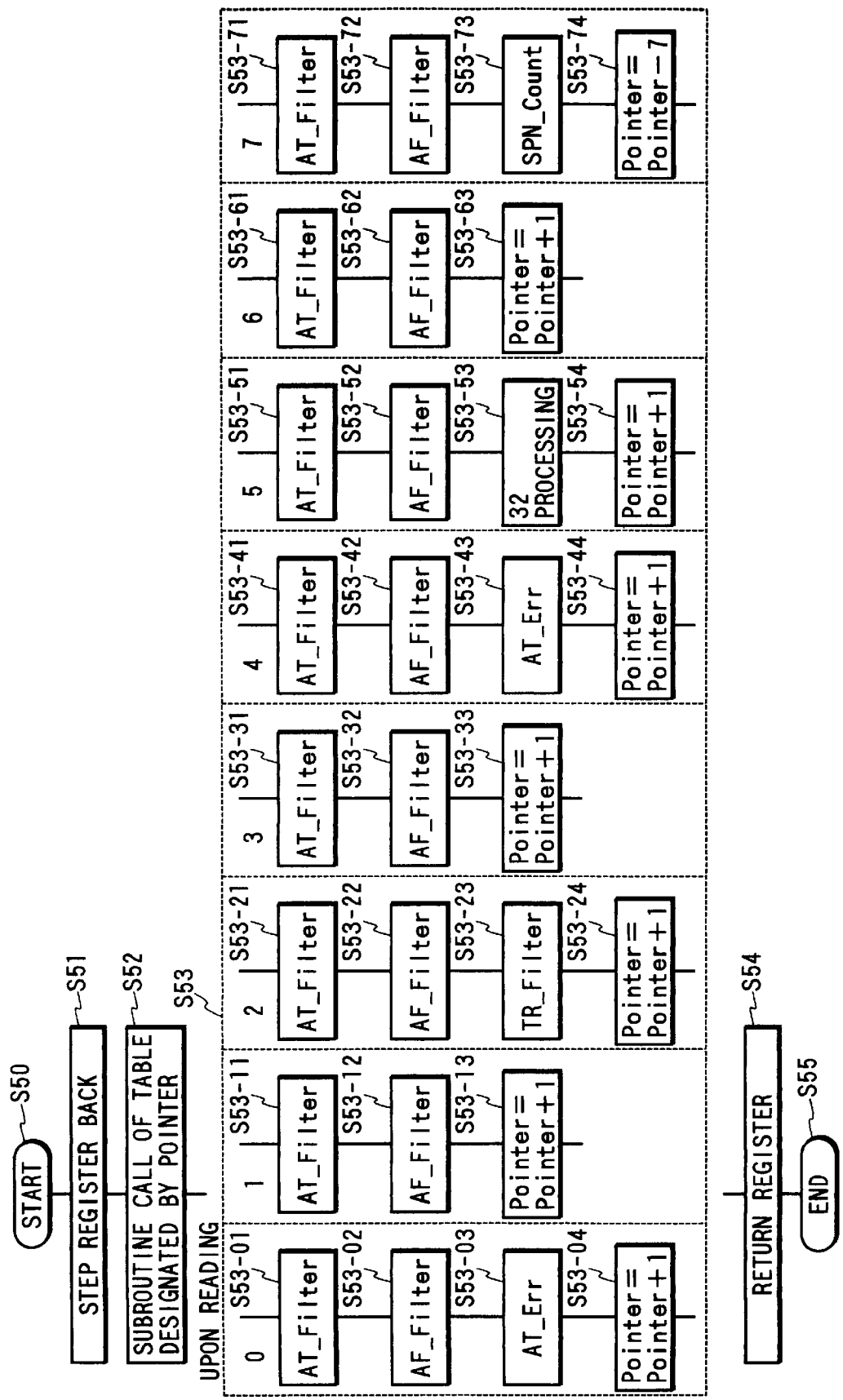
FIG. 14 is a flow chart of a predetermined mode according to the second embodiment of the present invention.

FIG. 14 is a flow chart showing the contents of the servo interrupt processing in the reading mode.

A variable Pointer indicates the above-mentioned tables, and designates table 0 in the reading mode as an initial value. In response to the trailing edge timing of a signal output from the clock generator 109, a program in each table in this vertical line operates at 20-μsec intervals. First, a register used by the CPU 102 immediately before this interrupt is saved (S51).

Then, the program designated by the variable Pointer is subroutine-called and activated (S52). Since table 0 in the reading mode is set in the variable Pointer as an initial value, table 0 is executed.

In the reading mode (S53), table 0 executes AT Filter processing (S53-01), AF Filter processing (S53-02), and AT Err processing (S53-03), and the variable Pointer is incremented by 1 (S53-04). With this processing, the variable Pointer designates table 1 in the reading mode.

The AT Filter processing (S53-01, S53-11, S53-21, S53-31, and the like) is a tracking phase compensation filter module. In this module, the CPU 103 reads a tracking error signal obtained by detecting the output from the photosensor 117 by the tracking error detector 113, and converting the detected signal into a digital signal by the A/D converter 120, and outputs a product-sum operation result of the current tracking error signal and a previously sampled tracking error signal to the D/A converter 121, thereby driving the tracking actuator 127 via the tracking driver 124. With this tracking phase compensation filter module, any phase difference due to a shift in position of the beam spot can be compensated for, and tracking can be accurately attained.

Similarly, the AF Filter processing (S53-02, S53-12, S53-22, S53-32, and the like) is a focusing phase compensation filter module. In this module, the CPU 103 reads a focusing error signal obtained by detecting the output from the photosensor 117 by the focusing error detector 114, and converting the detected signal into a digital signal by the A/D converter 120, and outputs a product-sum operation result of the current focusing error signal and a previously sampled focusing error signal to the D/A converter 121, thereby driving the focusing actuator 128 via the focusing driver 125. With this focusing phase compensation filter module, any phase difference due to a shift in position of the beam spot can be compensated for, and the focal point can be accurately adjusted to the pit surface of the optical disc.

The AT Err processing (S53-03, S53-43, and the like) is a module in which it is detected if the tracking error signal falls within a predetermined range, and if the signal exceeds the predetermined range, the laser power is set to be read power, the tracking servo loop is disabled, and a lead-in action of the beam is performed again.

Upon completion of the processing of table 0, the used register is restored (S54), thus ending the processing (S55).

When the next servo interrupt is generated, since the variable Pointer designates table 1, the register is saved (S51), and thereafter, table 1 designated by the value of the variable Pointer is subroutine-called (S52). Then, processing actions (S53-11 to S53-13) in table 1 in the reading mode are executed. Thereafter, the register is restored (S54), and the processing ends (S55). In this case, after the AT Filter processing (S53-11) and AF Filter processing (S53-12) are executed, the variable Pointer is incremented by 1 to designate table 2.

When the next servo interrupt is generated, since the variable Pointer designates table 2, the register is saved (S51), and thereafter, processing actions (S53-21 to S53-24) of table 2 are executed. In this case, after the AT Filter processing (S53-21), AF filter processing (S53-22), and TR Filter processing (S53-23) are executed, the variable Pointer is incremented by 1 to designate table 3.

Note that the TR Filter processing (S53-23) is a TRACE phase compensation filter module. In this module, the CPU 103 reads a lens position signal from the lens position sensor 118 of an objective lens corresponding to the input/output unit of an optical system, via the lens position detector 116 and the A/D converter 120, and corrects any displacement of the tracking actuator 127 using the linear motor 129. The TR Filter processing (S53-23) executes trace correction once in tables 0 to 7 in the reading mode.

Thereafter, similar steps are repeated in tables 3, 4, and 5.

Figure 15:
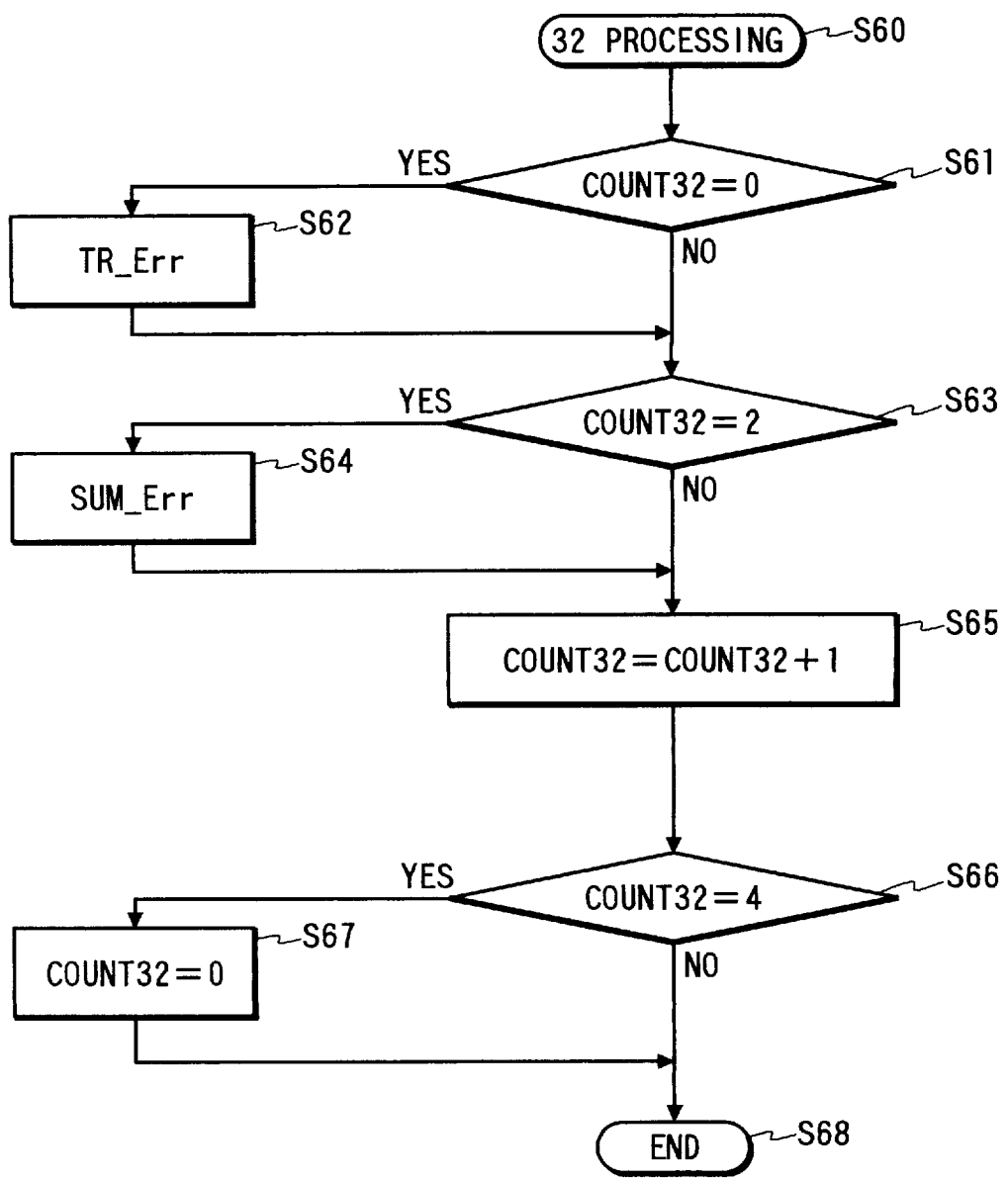
FIG. 15 is a flow chart of the 32 processing according to the second embodiment of the present invention.

FIG. 15 is a flow chart showing the 32 processing (S53-53) in table 5. In tables 3 and 4, the same processing actions as in tables 0 and 1 are executed. In table 5 as well, the AT Filter processing (S53-51) and AF Filter processing (S53-52) are executed before the 32 processing.

In the 32 processing (S53-53), 0 is set in a variable COUNT32 as an initial value. If COUNT32=0 (S61), TR Err processing is executed (S62); if COUNT32=2 (S63), SUM Err processing is executed (S64). The variable COUNT32 is incremented by 1 (S65). If COUNT32=4 (S66), the variable COUNT32 is cleared to zero (S67).

Therefore, since the TR Err processing and SUM Err processing are respectively executed once per four activations of the 32 processing activated at 160-μsec intervals, they are respectively activated at 640-μsec intervals.

Note that the TR Err processing is a module for monitoring the lens position signal to check if the displacement of the tracking actuator falls within a predetermined range.

On the other hand, the SUM Err processing is a module for detecting if the sum signal is equal to or higher than a predetermined level. When a focusing error of the beam spot has occurred, for example, when the sum signal level from the photosensor 117 is lowered by 4 points, it is determined that the beam spot is not irradiated onto the target recording pit, and a focusing error is actually detected.

After steps in table 5 are completed, tables 6 and 7 are similarly activated by a servo interrupt signal. Table 6 has the same steps as in table 1, and in table 7 as well, the AT Filter processing (S53-71) and AF Filter processing (S53-72) are executed.

Figure 16:
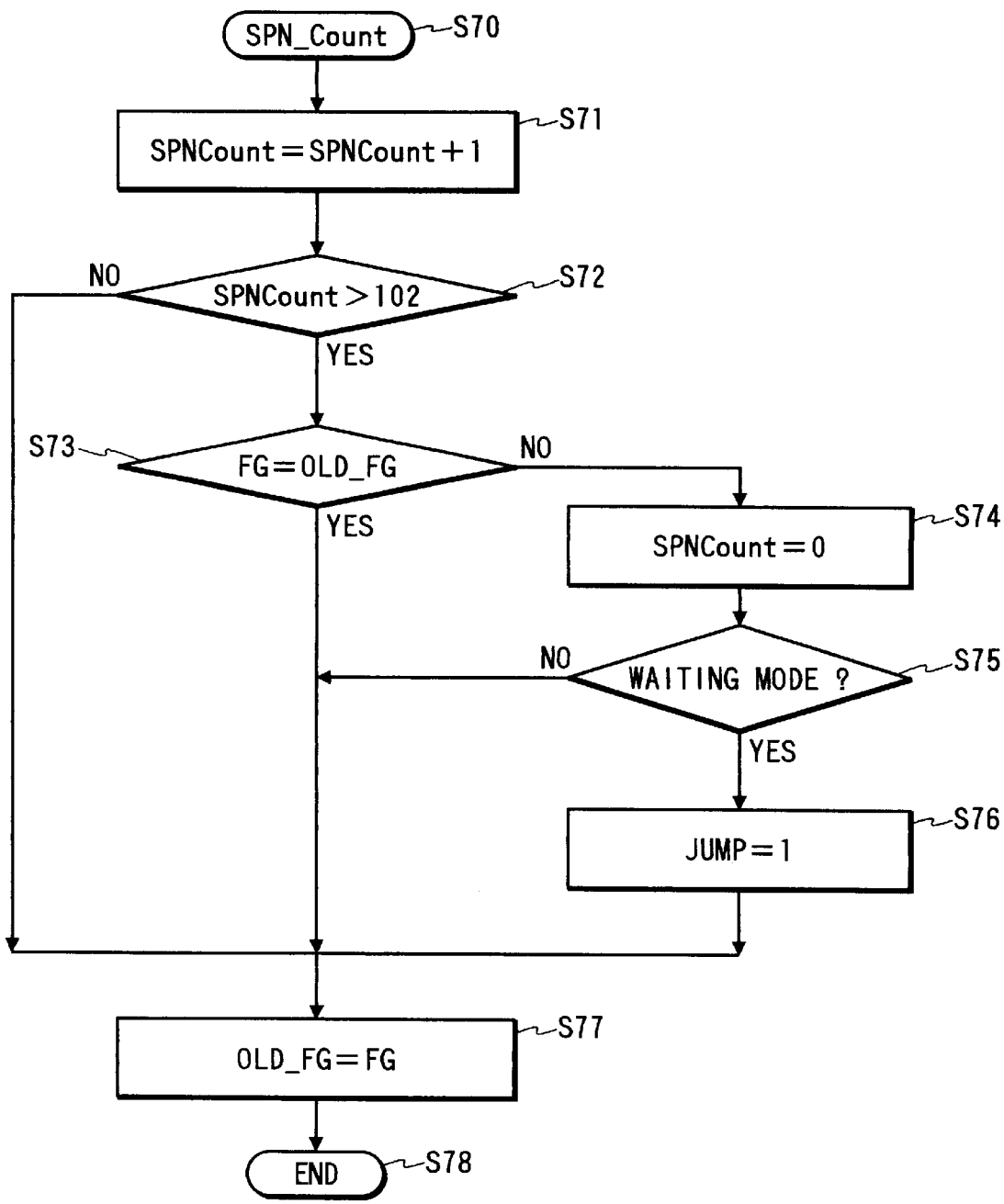
FIG. 16 is a flow chart of SPN Count processing according to the second embodiment of the present invention.

FIG. 16 is a flow chart showing the SPN Count processing executed in table 7. Since a spindle motor 130 rotates at, e.g., 3,600 rpm, the time required for one revolution is ⅟₆₀=16.67 msec. The variable SPN Count processing is activated at 0.16-msec intervals, and a variable SPN Count is incremented by 1 in this processing.

Therefore, the variable SPN Count is a counter which is incremented by 1 at 0.16-msec intervals (S71). For example, the spindle motor 130 completes one revolution when the count value is between 104 and 105. The spindle motor 130 incorporates a control circuit which outputs a rotation synchronization signal (FG signal) of 60 Hz synchronized with the revolution, and maintains a constant rotational speed. The rotation precision of the spindle motor 130 is assumed to be 1%. Thus, in this SPN Count processing, when the variable SPN Count is incremented initially, and the incremented value SPN Count is smaller than 102 (S72), the FG signal is read, and this value is set in OLD FG (S77), thus ending processing (S78). On the other hand, if SPN Count is equal to or larger than 102, the FG signal is read (S73), and is compared with the previously read FG (OLD FG). If the two FG values are different from each other, SPN Count is cleared (S74). If the mode of the apparatus is one of the reading, erasing/writing/and seeking modes (S75), the FG signal is read, and this value is set in OLD FG (S77), thus ending processing (S78). On the other hand, if the mode is the waiting mode (S75), a flag is set at the timing of a wait jump for performing a track jump action once per revolution of the disc, i.e., a variable JUMP=1, and the value FG is set in OLD FG (S77).

Since the variable SPN Count does not depend on the frequency of the FG signal, a wait jump action can be stably attained even in a spindle motor with a different FG frequency.

Furthermore, since the variable SPN Count is a numerical value obtained by equally dividing the disc in the circumferential direction, it can also be utilized in an action for canceling decentering. That is, the decentering amount of a disc is stored in units of numerical values of this counter, and a signal for canceling decentering is output to the tracking actuator 127 using the stored numerical value. The decentering amount of the disc is represented by the number of tracks which a beam spot fixed at one point crosses during rotation since the central axis of the disc is the main source of the deviation, and a decentering amount corresponding to the number of tracks, but in the opposite direction, is applied by the tracking actuator 127.

Thereafter, FG is substituted in the variable OLD FG, thus ending the processing (S78).

Therefore, as can be seen from the above description, even when a spindle motor using an FG signal of a different frequency is used, a track jump action can be stably attained once per revolution of the spindle motor.

In addition, since the circumferential position of the disc can be accurately detected using the counter used in a one-track jump action, an action for canceling the decentering component of the disc can be realized, and hence, stable servo processing can be executed.

Upon completion of the SPN Count processing (S53-73), as described above, the flow returns to the flow chart shown in FIG. 14, and the variable Pointer is decremented by −7 (S53-74) to designate table 0.

In this manner, since a servo interrupt signal is input at 20-μsec intervals, execution of the AT Filter processing and AF Filter processing at 20-μsec intervals, execution of the AT Err processing at 80-μsec intervals, execution of the TR Filter processing and SPN Count processing at 160-μsec intervals, and execution of the TR Err processing and SUM Err processing at 640-μsec intervals can be realized with almost no software discrimination steps.

FIG. 17 is a flow chart showing a subroutine for changing the servo state executed when the host computer 101 issues a command for changing the drive state.

The name of the next mode to be changed from the current mode state is defined as a New Mode, and the name of the current mode is defined as an Old Mode, and the address of table 0 is substituted in these variables.

When a servo interrupt is generated in this subroutine processing, the servo interrupt is masked to stop execution of processing, so as to prevent a change in the Pointer (S81). The variable Pointer which designates the next jump destination of the servo interrupt is added to the difference between New Mode and Old Mode (S82). Since the table sizes of the respective modes are equal to each other, the table to be processed next after this processing has the different mode but executes processing of the same table number.

Thereafter, the value of New Mode to be set is substituted in Old Mode indicating the current mode (S83), and masking of the servo interrupt is canceled (S84), thus ending the processing (S85).

For example, the reading action ends after the end of execution of table 6 in the reading mode, and when the Change Mode subroutine shown in FIG. 17 is executed to change the servo state to the waiting mode, the variable Pointer designates table 7 in the waiting mode.

In response to a servo interrupt, table 7 in the waiting mode is activated, and after execution of the AF Filter processing as the focusing phase compensation filter module, WAIT processing is executed.

The WAIT processing is a module for performing a one-track jump action when "1" is set in the JUMP flag indicating the track jump timing in FIG. 16, and clearing the JUMP flag to "0" upon completion of the track jump action. If the JUMP flag is not set, the AT Filter processing as the tracking phase compensation filter module is executed.

Thereafter, the SPN Count processing is executed. Since the SPN Count processing is set in table 7 in both the reading mode and the waiting mode, the processing interval is constant, i.e., 160 μsec.

In this manner, since a servo interrupt is masked upon mode switching of the servo state, stable servo processing can be realized without changing the arithmetic period.

As described above, even when the mode changes during its processing, since processing which requires a calculation at the same time intervals is assigned at identical positions in the respective tables, the processing interval can be constant.

In the waiting mode, tables 0, 1, 2, 3, 4, 5, and 6 are processed in turn after table 7 as in the reading mode. Therefore, the TR Filter processing as the TRACE phase compensation filter module can be executed at 80-μsec intervals even when the mode changes during its processing.

After execution of table 7 in the waiting mode, when the host computer 101 issues a data write command to a certain target sector, the mode is changed to the seeking mode to move the beam spot to the target track.

According to FIG. 17, the variable Pointer is changed to designate table 0 in the seeking mode, and table 0 in the seeking mode is executed in response to the next servo interrupt signal.

In the seeking mode, tables 0, 1, 2, 3, 4, 5, 6, and 7 are executed in turn as in the reading mode.

Velocity processing in tables 0 and 4 is a program for executing velocity control upon acceleration or deceleration of the seek action, and Track Count processing in tables 1 and 5 is a program for checking the number of tracks to cross. On the other hand, LPSV Filter processing in tables 2 and 6 is a lens position phase compensation filter module for fixing the tracking actuator 127 on the basis of the lens positioning signal during movement of the linear motor 129, and Velocity Check processing in tables 3 and 7 is a program for checking the moving velocity.

Since the SPN Count processing is set in table 7 as in other modes, the track jump timing and the decentering canceling timing are not disturbed.

Upon completion of movement to the target track, the mode is changed to the waiting mode. After the address ID of a sector to be subjected to recording is confirmed, the mode is set in the erasing/writing mode. AF Err processing in the erasing/writing mode is a program for checking if the focusing error signal exceeds a predetermined value.

In the erasing/writing mode as well, tables 0, 1, 2, 3, 4, 5, 6, and 7 are executed in turn as in other modes.

Since the TR Filter processing, 32 processing, and SPN Count processing are set at the same positions as in other modes, the predetermined time interval is not disturbed even when a mode change occurs.

In this embodiment, the minimum time interval is set to be 20 $\mu$sec. However, the present invention is not limited to this value. Also, other numerical values are merely examples to help easy understanding. For example, the oscillation frequency of the clock generator may be set to be 40 or 30 kHz or the clock generator may have a variable frequency.

In the above embodiment, each mode is divided into seven tables. However, the present invention is not limited to this number of tables. However, the present invention is limited in the sense that programs of the tables of the 32 processing, SPN Count processing, and the like must be processed on a single table in each mode.

What is claimed is:

1. An information recording/reproducing apparatus for recording information on and/or reproducing information from a recording medium using a head, said apparatus comprising:

a single processor for executing data input/output processing and servo processing of a light beam from the head, while alternately switching at a predetermined period, wherein the servo processing is divided into a plurality of blocks which are cyclically executed in turn for each predetermined period, and processing required to be executed in each period is set in each of the blocks of the plurality of blocks and processing not required to be executed in each period is selectively set in only specific blocks of the plurality of blocks; and memory means for storing contents of the processing for the respective blocks.

2. An apparatus according to claim 1, wherein the servo processing is divided into a plurality of modules in relation to respective operations, and each module includes the plurality of blocks which are cyclically executed in turn for each predetermined period.

3. An apparatus according to claim 2, wherein the plurality of modules comprise at least one of a recording operation, a reproducing operation, a seek operation, a preparatory operation for recording and/or reproducing, a servo-off operation, an abnormal detecting operation and a waiting operation.

4. An apparatus according to claim 2, wherein a module is divided into a plurality of modes corresponding to circumstances of operation, and each mode includes the plurality of blocks which are cyclically executed in turn for each predetermined period.

\* \* \* \* \*

UNITED STATES PATENT AND TRADEMARK OFFICE
CERTIFICATE OF CORRECTION

PATENT NO. : 5,878,005
DATED : March 2, 1999
INVENTORS : NOBUYUKI TONEGAWA, ET AL.

It is certified that error appears in the above-identified patent and that said Letters Patent is hereby corrected as shown below:

COLUMN 9:

line 22, "a" should read --an--.

Signed and Sealed this

Eleventh Day of January, 2000

Attest:

Q. TODD DICKINSON

Attesting Officer     Acting Commissioner of Patents and Trademarks